United States Patent
D'Addetta et al.

(10) Patent No.: US 12,351,153 B2
(45) Date of Patent: Jul. 8, 2025

(54) BRAKE SYSTEM AND METHOD FOR OPERATING A BRAKE SYSTEM

(71) Applicant: Robert Bosch GmbH, Stuttgart (DE)

(72) Inventors: Gian Antonio D'Addetta, Stuttgart (DE); Heiko Freienstein, Weil der Stadt (DE); Joram Berger, Heimsheim (DE); Laszlo Boros, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 18/553,626

(22) PCT Filed: Jun. 13, 2022

(86) PCT No.: PCT/EP2022/065928
§ 371 (c)(1),
(2) Date: Oct. 2, 2023

(87) PCT Pub. No.: WO2022/268542
PCT Pub. Date: Dec. 29, 2022

(65) Prior Publication Data
US 2024/0051507 A1    Feb. 15, 2024

(30) Foreign Application Priority Data
Jun. 24, 2021   (DE) ............... 10 2021 206 563.5

(51) Int. Cl.
*B60T 8/1761* (2006.01)
*B60T 7/22* (2006.01)
*B60T 13/16* (2006.01)

(52) U.S. Cl.
CPC ......... *B60T 8/17616* (2013.01); *B60T 7/22* (2013.01); *B60T 13/165* (2013.01); *B60T 2210/32* (2013.01); *B60T 2250/00* (2013.01)

(58) Field of Classification Search
CPC ............. B60T 13/165; B60T 2210/32; B60T 2250/00; B60T 7/22; B60T 8/17558; B60T 8/17616
See application file for complete search history.

(56) References Cited

U.S. PATENT DOCUMENTS

| 6,275,772 B1 * | 8/2001 | Sugimoto | ............... B60T 7/22 342/174 |
| 2009/0038873 A1 * | 2/2009 | Lucas | ...................... B60T 7/22 180/275 |

(Continued)

FOREIGN PATENT DOCUMENTS

| DE | 19948365 A1 | 5/2000 |
| DE | 102004058814 A1 | 6/2006 |

(Continued)

OTHER PUBLICATIONS

International Search Report for PCT/EP2022/065928, Issued Nov. 8, 2022.

*Primary Examiner* — Carl C Staubach
(74) *Attorney, Agent, or Firm* — NORTON ROSE FULBRIGHT US LLP (57) ABSTRACT

A brake system for a motor vehicle. The brake system includes an autonomous emergency braking system to ascertain an object list using sensor data and continuously update the object list based on newly added sensor data, to ascertain a braking event based on the object list at a first point in time and to activate the actuating device to generate a hydraulic force if a braking event is ascertained, to recognize whether the braking event is still present based on the updated object list at a second point in time, after the first point in time; and to activate the hydraulic unit directly to reduce the hydraulic force applied to at least one wheel brake of the motor vehicle if the braking event is no longer present.

10 Claims, 6 Drawing Sheets

(56) References Cited

U.S. PATENT DOCUMENTS

| | | | | |
|---|---|---|---|---|
| 2011/0044507 A1* | 2/2011 | Strauss | ................ | B60W 40/04 |
| | | | | 382/103 |
| 2014/0032094 A1* | 1/2014 | Heinrichs-Bartscher | ................... | |
| | | | | B60W 50/0097 |
| | | | | 701/301 |
| 2016/0280190 A1* | 9/2016 | Franz | ..................... | B60Q 9/008 |
| 2017/0358209 A1* | 12/2017 | Ohmori | ................ | B60W 30/08 |
| 2019/0071074 A1* | 3/2019 | Gokan | ................. | G01S 13/931 |
| 2019/0241161 A1* | 8/2019 | Aitidis | ................ | B60W 30/09 |
| 2019/0300012 A1* | 10/2019 | Tsukada | ................ | B60T 8/1766 |
| 2022/0221580 A1* | 7/2022 | Radwan | ................ | B60W 50/14 |
| 2022/0221868 A1* | 7/2022 | Mujica | ................... | G05D 1/617 |

FOREIGN PATENT DOCUMENTS

| | | |
|---|---|---|
| DE | 102005025510 A1 | 12/2006 |
| DE | 102009001401 A1 | 9/2010 |
| EP | 3225472 A1 | 10/2017 |
| EP | 3407327 A1 | 11/2018 |

* cited by examiner

BRAKE SYSTEM AND METHOD FOR OPERATING A BRAKE SYSTEM

FIELD

The present invention relates to a brake system for a motor vehicle and a method for operating a brake system for a motor vehicle.

BACKGROUND INFORMATION

Typical brake boosters operate as vacuum boosters or hydraulically. In newer vehicles with efficient combustion engines or hybrid drives or in purely electric vehicles, vacuum-independent solutions for the brake system are typically used. These refer to brake boosters which do not operate as vacuum boosters.

An exemplary vacuum-independent, electromechanical brake booster is the iBooster by Bosch. In electromagnetic brake boosters, brake pressure can be built up quickly and set very precisely via the electronic control. This is particularly advantage for autonomous emergency braking systems, since it results in shorter stopping distances, in particular in the case of autonomous emergency braking.

An electromechanical brake booster is described in German Patent Application No. DE 10 2009 001 401 A1. This patent application describes a brake system and method for operating a brake system, the brake system being designed to output a boost pressure signal, taking into account a control signal provided by an on-board sensor and/or control device, and to relay a boost pressure signal to the wheel brake cylinder via a hydraulic unit.

In vehicles without electromechanical brake boosters, the autonomous braking intervention typically takes place exclusively via a driver assistance system for vehicle dynamics, for instance an ESP (electronic stability program) system.

The anti-lock braking system (ABS) is a further component of most brake systems. The anti-lock braking system autonomously controls the wheel slip in at least one of the wheels of the motor vehicle. In the case of a manually initiated emergency braking situation, the ABS control unit typically recognizes a sudden change in speed at the wheel and consequently reduces the brake pressure at the wheel via the ABS hydraulics, i.e. via two solenoid valves which are mounted on the pressure line. The first solenoid valve initially closes the line to the master brake cylinder here. If the wheel speed drops further, brake fluid is discharged via the second solenoid valve and the brake pressure drops slightly. An electric pump in the hydraulic unit pumps this brake fluid back into the system.

SUMMARY

The present invention provides a brake system for a motor vehicle and a method for operating a brake system of a motor vehicle.

Preferred specific embodiments of the present invention are disclosed herein.

According to a first aspect, the present invention relates to a brake system for a motor vehicle. According to an example embodiment of the present invention, the brake system has an actuating device, which is designed to generate a hydraulic force, a transmission device, which is designed to transmit the hydraulic force generated by the actuating device to at least one wheel brake of the motor vehicle, an anti-lock braking system, has a hydraulic unit (solenoid valve unit), the hydraulic unit being designed to reduce a hydraulic force applied to at least one wheel brake of the motor vehicle, and an autonomous emergency braking system, which is designed to ascertain an object list using sensor data and to continuously update the object list on the basis of newly added sensor data, to ascertain a braking event on the basis of the object list at a first point in time and to activate the actuating device to generate a hydraulic force if a braking event is ascertained, to recognize whether the braking event is still present on the basis of the updated object list at a second point in time, after the first point in time, and to activate the hydraulic unit directly to reduce the hydraulic force applied to at least one wheel brake of the motor vehicle if it is ascertained that the braking event is no longer present.

According to a second aspect, the present invention relates to a method for operating a brake system of a motor vehicle. According to an example embodiment of the present invention, an object list is ascertained using sensor data, the object list being continuously updated on the basis of newly added sensor data. A braking event is ascertained on the basis of the object list at a first point in time. A hydraulic force is generated by an actuating device of the brake system, a transmission device of the brake system transmitting the hydraulic force generated by the actuating device to at least one wheel brake of the motor vehicle. It is ascertained whether the braking event is still present on the basis of the updated object list at a second point in time, after the first point in time. The hydraulic force applied to at least one wheel brake of the motor vehicle is reduced by a hydraulic unit of an anti-lock braking system of the brake system if it is ascertained that the braking event is no longer present.

The present invention makes it possible to react very quickly to false-positive detections. These refer to detections in which a braking event is initially detected, i.e., a possible hazardous situation in which autonomous braking is required. In the case of a false-positive detection, autonomous emergency braking is therefore triggered although the situation is not critical in terms of the accident risk. Based on a more precise evaluation of the sensor data or with the aid of further sensor data, it is subsequently recognized that autonomous braking is not required. In this case, the braking force at at least one wheel brake is reduced using the anti-lock braking system.

The present invention therefore makes provision for the hydraulic unit of the anti-lock braking system to be coupled to the autonomous emergency braking system (AEB system). The autonomous emergency braking system here is an important part of the active safety system. In particular, it is necessary to take into consideration the occurrence of false-positive and false-negative detections. False-negative detections must be substantially prevented since hazardous situations are not recognized in this case. A significant number of false-positive detections traditionally leads to frequent and too heavy braking, which may likewise result in hazardous situations, for instance due to possible collisions.

According to an example embodiment of the present invention, too heavy braking is prevented by using the anti-lock braking system to reduce the brake pressure so that a reduction in the brake pressure may already occur before the actuating device has fully built up the brake pressure.

In this regard, the build-up of the brake pressure by the actuating device typically lasts at least 150 milliseconds. Owing to the discharge of pressure via the anti-lock braking system, the increasing brake pressure may be decreased, for example, in less than 30 milliseconds in the event that a false-positive detection is recognized (i.e., if a braking event is no longer present). Therefore, after the correction, there is only a minimum braking effect and, in particular, also no significant change in velocity.

The autonomous emergency braking system may therefore reduce the brake pressure at least one cycle earlier than in braking systems in which the brake pressure is reduced via an ESP system. This represents a significant reduction when taking into account the latency chain in emergency braking systems.

Furthermore, the early termination of undesired braking processes affects the driving experience in a positive way since the driver will feel less of an effect. Furthermore, the possible occurrence of a slight jolt may also serve to increase the alertness of the occupants.

According to a further specific embodiment of the brake system of the present invention, the actuating device has an electromechanical brake booster, which is designed to build up the brake pressure. The electromechanical brake booster is vacuum-independent here.

According to a further specific embodiment of the brake system of the present invention, the autonomous emergency braking system is furthermore designed to activate the actuating device to reduce the hydraulic force if the autonomous emergency braking system ascertains that the braking event is no longer present. The brake pressure is thus further reduced.

According to a further specific embodiment of the brake system of the present invention, the autonomous emergency braking system is designed to fuse sensor data and, using the sensor data fused after the first point in time, to ascertain whether the braking event is still present. In this regard, for instance, sensor data of multiple sensors of the same type (or multiple cameras or radar sensors) or sensor data of different sensors may be fused. As a result, the recognition of whether a braking event is actually present is further improved. For instance, if a braking event has been detected, and autonomous braking initiated, based on the sensor data of an individual sensor, the correction may take place by activating the anti-lock braking system if a new assessment is provided on the basis of the sensor fusion.

According to a further specific embodiment of the brake system of the present invention, the autonomous emergency braking system is designed to ascertain trajectories of the motor vehicle and/or of objects in the environment of the motor vehicle and, using the ascertained trajectories, to ascertain whether the braking event is still present. By way of example, object tracking may be carried out. If, on the basis of the tracking, it is revealed that a collision is not to be expected, the correction may take place by activating the anti-lock braking system. As a result, it is possible to precisely recognize whether a braking event is actually present.

According to a further specific embodiment of the brake system of the present invention, after ascertaining that the braking event is no longer present, the autonomous emergency braking system is designed to activate the anti-lock braking system to reduce the hydraulic force applied to at least one wheel brake of the motor vehicle before the actuating device has fully generated the hydraulic force to be generated. The brake system may thus react very quickly to false-positive detections.

According to a further specific embodiment of the present invention, to transmit a signal, the brake system has a bypass connection which connects the emergency braking system directly to the hydraulic unit, the emergency braking system being designed to activate the hydraulic unit directly via the bypass connection to reduce the hydraulic force applied to at least one wheel brake of the motor vehicle if it is ascertained that the braking event is no longer present. As a result, the hydraulic unit is activated quickly and directly.

According to a further specific embodiment of the brake system of the present invention, the autonomous emergency braking system is designed to ascertain the braking event on the basis of little sensor data. By way of example, the autonomous emergency braking system may evaluate only one or two video frames, LiDAR frames and/or radar frames. In this regard, a more robust AEB system may be achieved on the one hand whilst, on the other, greater efficiency in actual cases which are not covered by current consumer tests etc. may be realized. The brake system therefore enables the intervention strategy to be selected more progressively and therefore earlier since it provides the option of very quick correction. This time can be converted directly into the effectiveness of the emergency braking systems. The improved reaction time may lead to significant improvements, particularly in the area of pedestrian protection.

The robustness is particularly important if driving through scenarios in which there is greater situational uncertainty or a sudden worsening of the situation may occur (for example influenced by visual obstructions). Such situations are relevant and are therefore also addressed to a greater extent here and in current consumer protection tests. An exemplary situation may occur if people or children step out onto the road between two vehicles—possibly in adverse environmental conditions, for instance when it is raining or in poor light conditions. At this point, a progressive adjustment of the parameters for the autonomous braking system may be selected and therefore full braking may be started up to 100 ms earlier and, in an emergency situation, carried out up to 100 ms earlier. As a result, the collision with the pedestrian may be prevented entirely or at least the velocity of an impact with the pedestrian may be significantly reduced. This means that the pedestrian is at significantly lower risk of injury and contact between the pedestrian's head and, for example, the windshield may be prevented.

According to a further specific embodiment of the present invention, the brake system comprises an ESP system and an interface between the autonomous emergency braking system and the ESP system, the ESP system being designed to control the anti-lock braking system. Via the interface, the autonomous emergency braking system may transmit a command for decreasing the pressure to the ESP system, even if the independent procedure of building up the pressure via the actuating device has not yet been completed.

The procedure according to the present invention furthermore distinguishes itself from the procedure in regenerative braking devices. In this case, a blending of the braking torque is carried out to achieve the highest possible regeneration level, i.e. the braking torques of the wheel brake cylinders are adapted in various ways to the current braking torque of the regenerative braking device in different situations.

According to a further specific embodiment of the brake system of the present invention, it is further ascertained whether the driver is braking manually. If this is the case, the anti-lock braking system is not activated to reduce the hydraulic force applied to at least one wheel brake of the motor vehicle. The driver should therefore be able to maintain ultimate control over the braking behavior.

By way of example, emergency braking may initially take place due to cross traffic at crossroads. After the reassessment of the situation on the basis of further sensor data, the correction may be made by activating the anti-lock braking system. An intervention in the case of cross traffic may be started, for example, if the collision is possible but there is still a high level of uncertainty regarding the precise trajectory of the vehicles involved. A significant reduction in velocity and a large shift in the impact point might then be initiated. Since the latter increases quadratically over time, early intervention is particularly important here. A reassessment of the situation might correct the intervention or terminate it entirely and therefore reduce the effect to the extent that there is barely a difference from non-intervention.

As a further example, the triggering of the autonomous braking maneuver may take place due to a vehicle crossing on a collision course. The autonomous emergency braking system selects an optimum impact point via the braking maneuver. If it is established from further measurements that the impact point has shifted to an unfavorable position, e.g. to the passenger compartment, canceling the braking may prevent a worsening of the situation.

According to a further specific embodiment of the method of the present invention for operating a brake system, sensor data are fused and, using the sensor data fused after the first point in time, it is ascertained whether the braking event is still present.

According to a further specific embodiment of the method of the present invention for operating a brake system, trajectories of the motor vehicle and/or of objects in the environment of the motor vehicle are ascertained and, using the ascertained trajectories, it is ascertained whether the braking event is still present.

BRIEF DESCRIPTION OF THE DRAWINGS

In all figures, similar or functionally similar elements and systems are denoted by the same reference signs. The numbering of method steps is provided for clarity and is not intended to imply a specific time sequence. In particular, multiple method steps may also be carried out at the same time.

DETAILED DESCRIPTION OF EXAMPLE EMBODIMENTS

Figure 1:
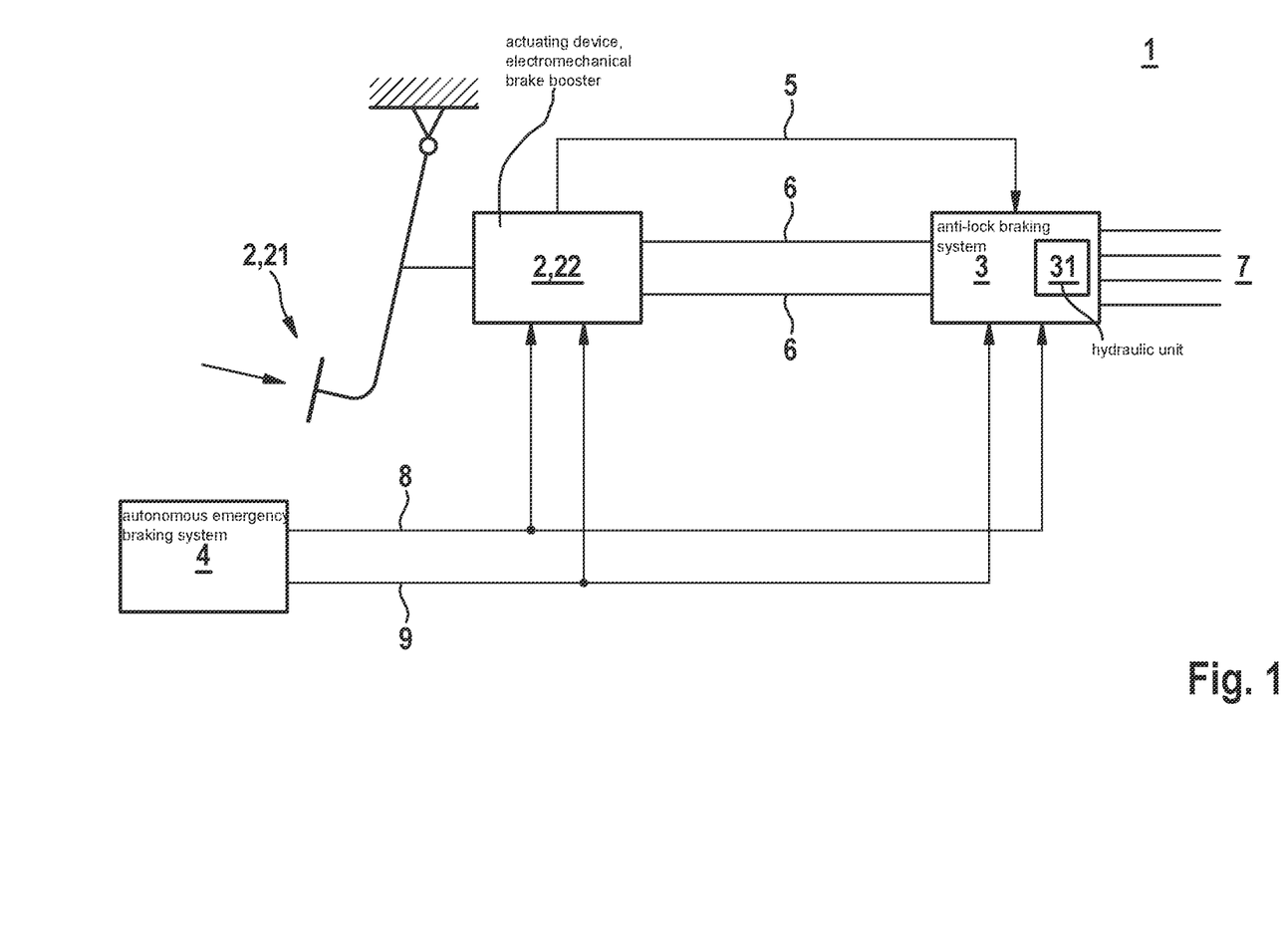
FIG. 1 shows a block diagram of a brake system according to a specific embodiment of the present invention.

FIG. 1 shows a block diagram of a brake system 1 for a motor vehicle. The brake system 1 comprises an actuating device 2, via which a hydraulic force may be generated. The actuating device 2 comprises a brake pedal 21 and an electromechanical brake booster 22. When pressure is applied to the brake pedal 21, the electromechanical brake booster 22 becomes active and the hydraulic force is generated.

The brake system 1 further comprises a transmission device 6, 7, which transmits the hydraulic force generated by the actuating device 2 to at least one wheel brake of the motor vehicle. The brake system 1 further comprises an anti-lock braking system 3, which is arranged between a first portion 6 of the transmission device, which leads to the electromechanical brake booster 22, and a second portion 7 of the transmission device, which leads to the wheel brakes.

The brake system 1 comprises an autonomous emergency braking system 4. The emergency braking system 4 ascertains an object list using sensor data. By way of example, the emergency braking system 4 may evaluate sensor data of radar sensors, LiDAR sensors, vehicle cameras or the like for this purpose. The emergency braking system 4 carries out object tracking and therefore continuously updates the object list on the basis of newly added sensor data. Multiple sub-processes may be carried out here.

In this regard, in an association step, it may firstly be ascertained which data from the current measurement pertain to—i.e. are associated with—an object which is already recorded.

In an update step, it is ascertained how the current measurement influences the object status of the objects of the object list. By way of example, an object which is initially classified as a road user or obstacle may be reclassified on the basis of new sensor data. By way of example, an object which does not enable a vehicle to drive under or over it may, on the basis of new measurements, be classified as an object which enables a vehicle to drive under or over it. It may thus be determined, in particular, whether the objects of the object list are still relevant.

Furthermore, a prediction step may be carried out, in which it is predicted how the object will move, i.e. trajectories of the objects are ascertained. The trajectory of the motor vehicle itself may also be calculated and updated.

The autonomous emergency braking system 4 ascertains a braking event on the basis of the object list at a first point in time and initiates a braking procedure. The actuating device 2 is activated by the emergency braking system 4 to generate a hydraulic force if it ascertains the braking event.

The emergency braking system 4 continuously checks whether the braking event is still present on the basis of the newly added sensor data. If, from a reassessment of the objects, for instance due to a different classification or an expected change to a movement path, it is revealed that a braking event is no longer present at a later, second point in time, the emergency braking system 4 activates the hydraulic unit 31 directly. The hydraulic unit 31 then reduces the hydraulic force applied to at least one wheel brake of the motor vehicle.

The reduction in the hydraulic force may take place via the usual mode of operation of the hydraulic unit 31 of the anti-lock braking system 3. The hydraulic unit 31 therefore reduces the brake pressure applied to the wheel brakes by opening and closing valves of the hydraulic unit 31 and return-pumping the brake fluid.

In parallel with this, the emergency braking system 4 may also activate the actuating device 2 to reduce the hydraulic force.

The emergency braking system 4 therefore transmits both an activation signal 8 for a setpoint deceleration (if a braking event is recognized) and an activation signal 9 for terminating the braking procedure (if it is recognized that the braking event is no longer present) to the electronic brake booster 22 and the anti-lock braking system 3. To activate the hydraulic unit 31, a bypass connection may be used here, via which the hydraulic unit 31 may be accessed directly. A signal 5 to indicate whether it is the driver braking the vehicle may furthermore be transmitted from the electronic brake booster 22 to the anti-lock braking system 3. The reduction in the brake pressure is only carried out if it is not the driver braking the vehicle.

The autonomous emergency braking system 4 may be designed to be triggered relatively early, i.e. to ascertain a braking event. The data taken into account for this may include sensor data or fused sensor data as well as further information, for instance the latency times of the sensors and the fusion.

Figure 2:
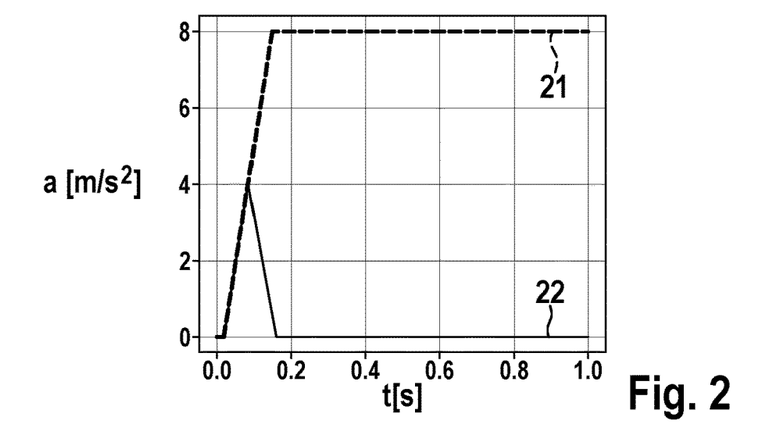
FIG. 2 shows an exemplary acceleration profile over time.
Figure 3:
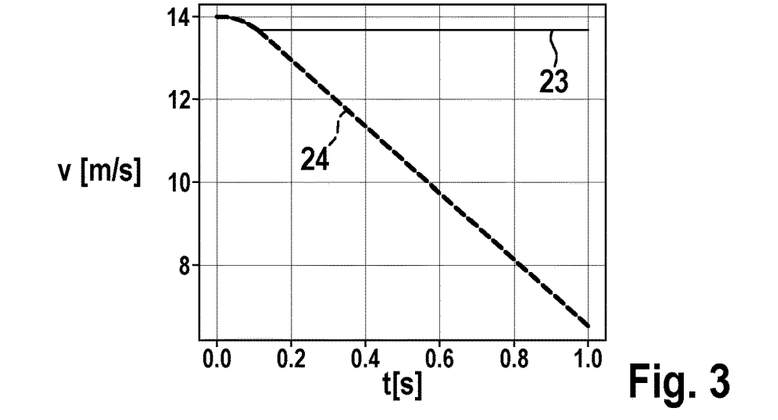
FIG. 3 shows an exemplary velocity profile over time.
Figure 4:
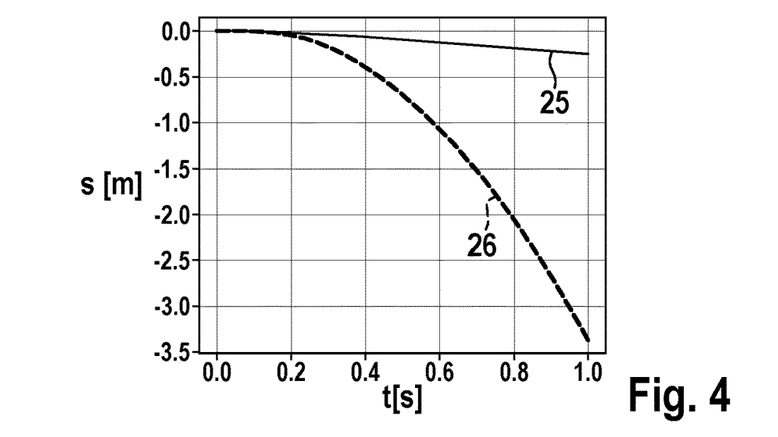
FIG. 4 shows an exemplary profile for distances covered over time.

The effect of a quick brake release is illustrated in FIGS. 2 to 4.

FIG. 2 shows an exemplary acceleration profile over time. In FIG. 2, the acceleration a is illustrated over time in m/s². FIG. 3 shows the velocity over time in m/s. Finally, FIG. 4 shows the braking-induced reduction in the distance s covered over time in meters. If a collision is detected, the braking force is increased as quickly as possible in order to have the greatest possible effect on the reduction in velocity and the shift in the impact point. However, if this effect is not desired and the correction takes place quickly, the effect remains comparable to non-intervention. The acceleration profile 21, the velocity profile 23 and the profile for the distance 25 correspond to the acceleration, velocity and distance for the originally initiated intervention, and the acceleration profile 22, the velocity profile 24 and the profile for the distance 26 correspond to the corrected intervention.

In the case of the intervention by the anti-lock braking system 3, the brief build-up of brake pressure reduces the velocity v only slightly. The relative vehicle position, i.e. the shorter distance s covered as a result of braking, is multiple meters in the case of the original intervention and is reduced to a few centimeters as a result of the correction.

Figure 5:
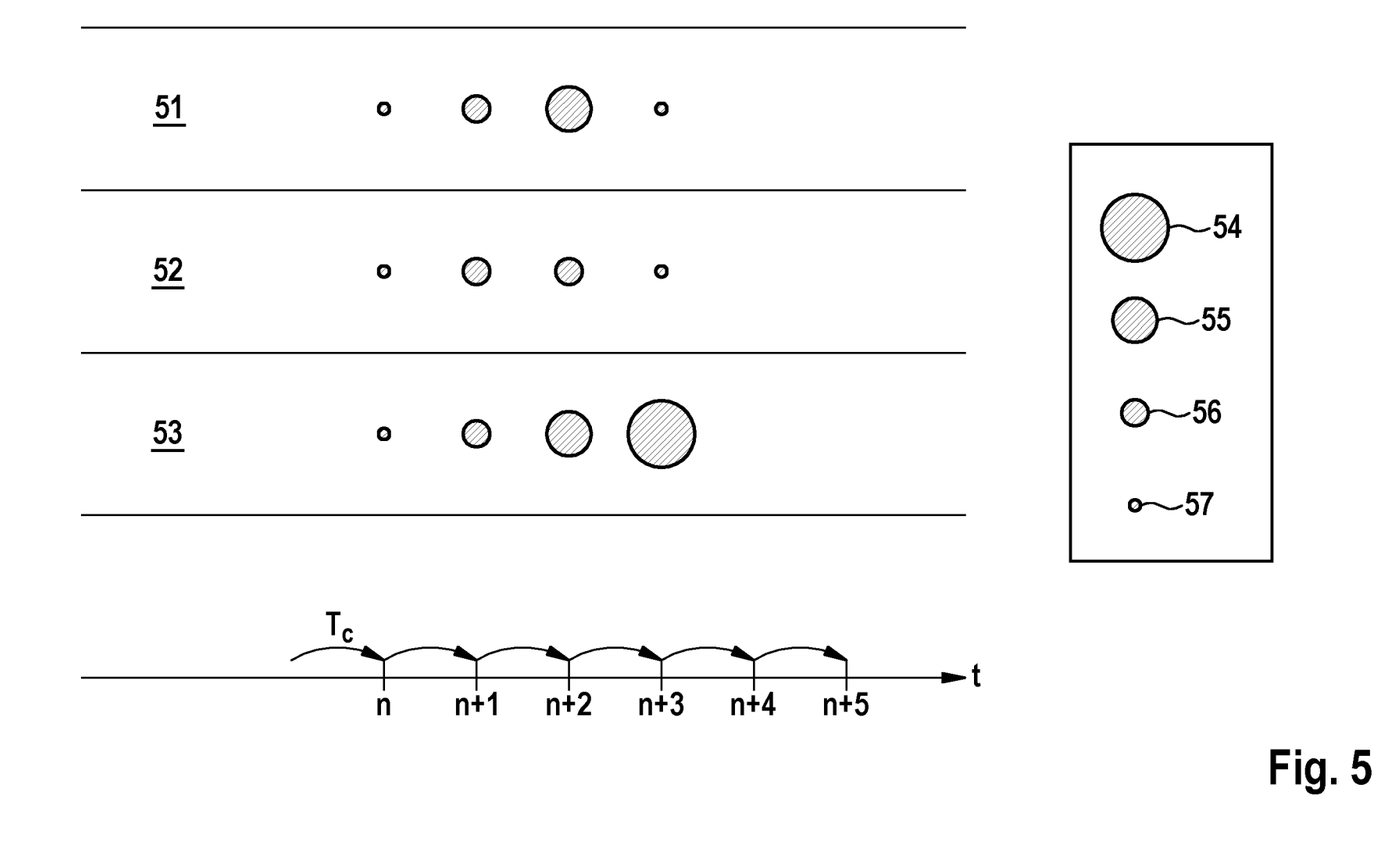
FIG. 5 shows exemplary time profiles for different driving situations.

FIG. 5 shows exemplary time profiles for different driving situations 51, 52, 53, in which the risk of a collision is plotted (i.e. over time t) for different measurement cycles n to n+5 in each case. In terms of the risk, differentiations are made between a very high risk 54 through to a very low risk 57, i.e., by way of example, four levels are differentiated. However, the present invention is not restricted to a specific number of levels.

In the case of a first profile 51, the ascertained risk initially increases from the lowest level to the second lowest level and to the second highest level and then drops to the lowest level again. In the case of a second profile 52, the ascertained risk initially increases from the lowest level to the second lowest level, remains at the second lowest level and then drops to the lowest level again. In the case of a third profile 53, the risk increases in each cycle, from the lowest level to the highest level.

Figure 6:
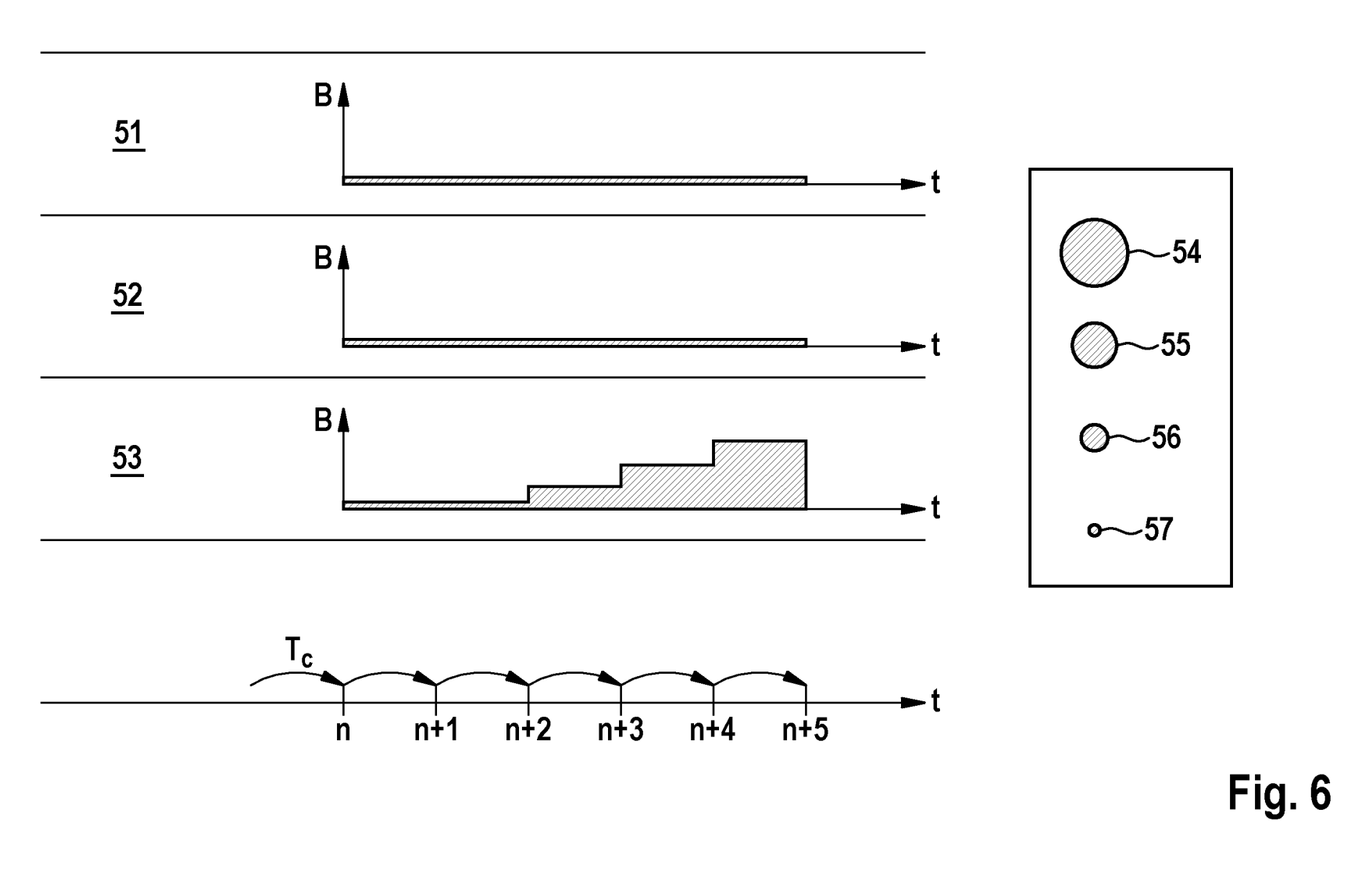
FIG. 6 shows exemplary time profiles for ascertaining braking events with a high triggering threshold.

FIG. 6 shows exemplary time profiles for ascertaining braking events with a high triggering threshold. In this scenario, triggering only takes place once the highest level is reached.

Therefore, the braking event is only recognized, and the braking procedure initiated, in cycle n+3 in the third profile. The brake pressure is fully built up after three cycles, i.e. in cycle n+5.

Figure 7:
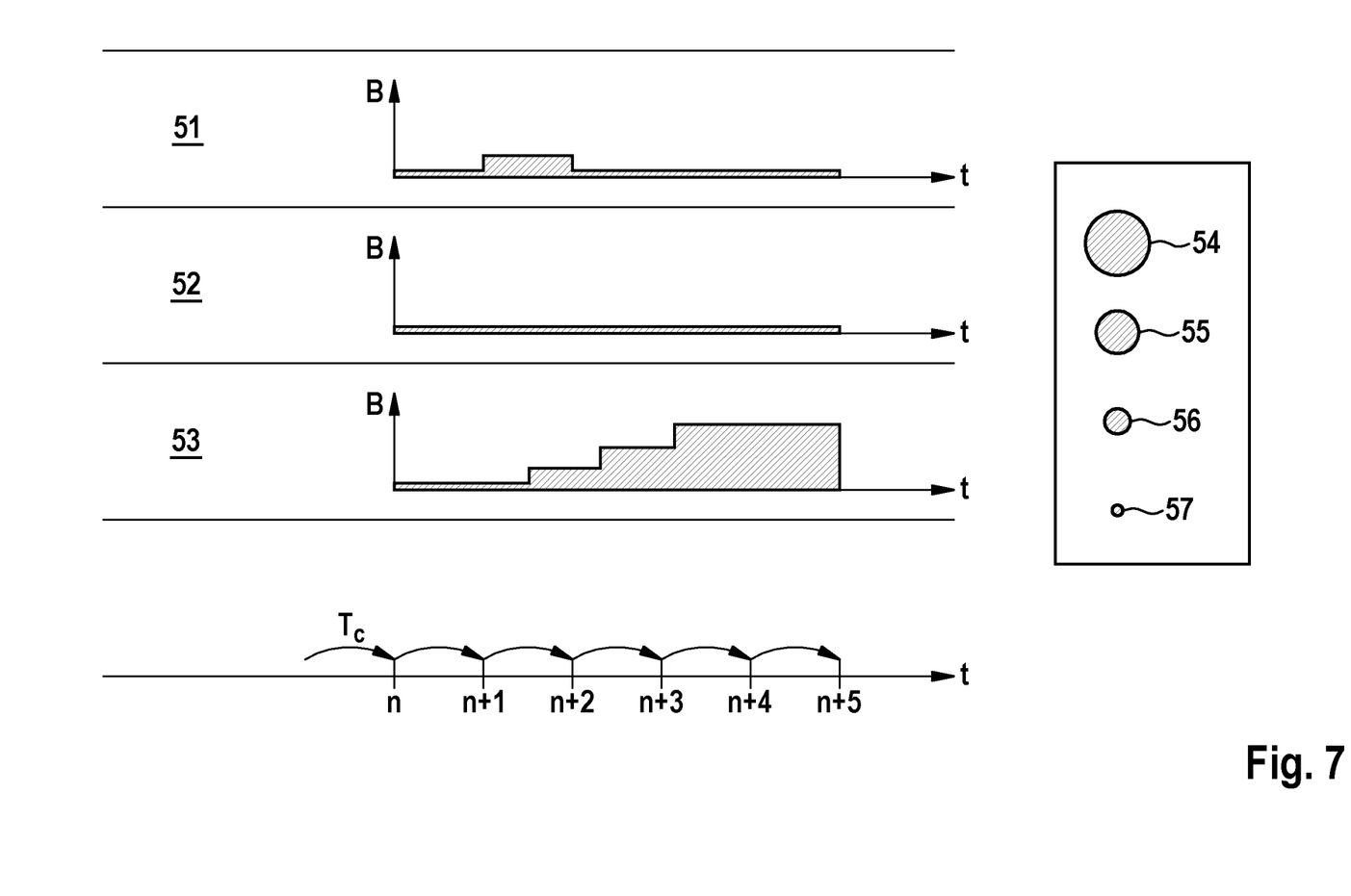
FIG. 7 shows exemplary time profiles for ascertaining braking events with a low triggering threshold.

FIG. 7 shows exemplary time profiles for ascertaining braking events with a low triggering threshold. In this scenario, triggering takes place once the second highest level is reached. Therefore, a braking event is also recognized at cycle n+2 in the first profile. Since the risk subsequently drops again, the hydraulic unit 31 is activated to reduce the hydraulic force. In the third profile 53, the braking event may already be recognized, and the braking procedure initiated, in cycle n+2. Sine it is possible to quickly counteract the triggered braking procedure, the present invention enables a braking event to be detected earlier, i.e. preferably according to the method shown in FIG. 7, for instance. As a result, it is possible to react one cycle earlier, for example. Due to the progressive triggering, it is possible to brake earlier. An initiated braking maneuver is corrected before a significant change in velocity is instigated, so long as it is clear that the situation is not worsening, i.e. a braking event is no longer present.

Figure 8:
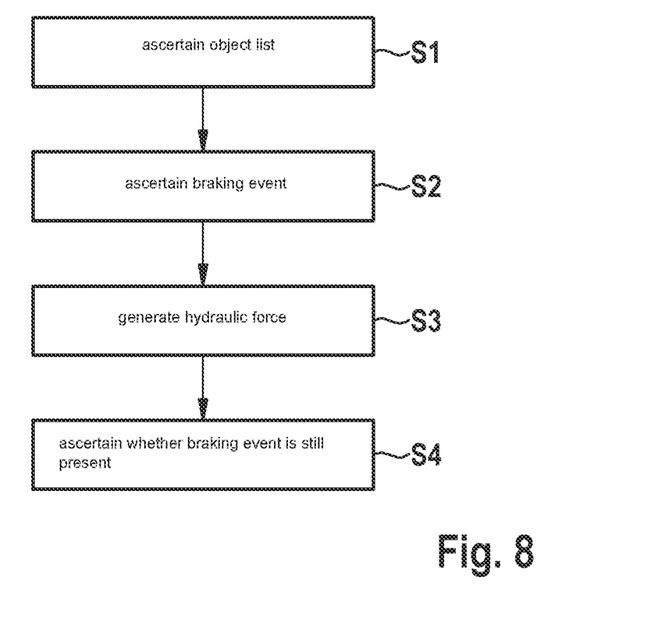
FIG. 8 shows a flow chart for a method for operating a brake system according to a specific embodiment of the present invention.

FIG. 8 shows a flow chart for a method for operating a brake system, in particular a brake system 1 described above.

In a first method step S1, an object list is ascertained using sensor data, the object list being continuously updated on the basis of newly added sensor data.

In a method step S2, a braking event is ascertained on the basis of the object list at a first point in time.

In a third method step S3, a hydraulic force is generated by an actuating device 2 of the brake system 1, a transmission device 6,7 of the brake system 1 transmitting the hydraulic force generated by the actuating device 2 to at least one wheel brake of the motor vehicle.

In a method step S4, it is ascertained whether the braking event is still present on the basis of the updated object list at a second point in time, after the first point in time. To this end, it is possible to use fused sensor data which have been ascertained by sensors after the first point in time. In particular, a classification of the objects and/or an ascertained trajectory of the objects may be taken into account in order to recognize whether the braking event is still present. The hydraulic force applied to at least one wheel brake of the motor vehicle 1 is furthermore reduced by a hydraulic unit of an anti-lock braking system of the brake system 1 if it is ascertained that the braking event is no longer present.

What is claimed is:

1. A brake system for a motor vehicle, comprising:
   an actuating device configured to generate a hydraulic force;
   a transmission device configured to transmit the hydraulic force generated by the actuating device to at least one wheel brake of the motor vehicle;
   an anti-lock braking system, having a hydraulic unit, wherein the hydraulic unit is configured to reduce a hydraulic force applied to at least one wheel brake of the motor vehicle; and
   an autonomous emergency braking system configured to:
   ascertain an object list using sensor data and to continuously update the object list based on newly added sensor data,
   ascertain a braking event based on the object list at a first point in time, and activate the actuating device to generate a hydraulic force when the braking event is ascertained;
   ascertaining whether the braking event is still present based on the updated object list at a second point in time, after the first point in time; and
   activate the hydraulic unit directly to reduce the hydraulic force applied to at least one wheel brake of the motor vehicle based on ascertaining that the braking event is no longer present.

2. The brake system as recited in claim 1, wherein the actuating device includes a electromechanical brake booster, which is configured to build up brake pressure.

3. The brake system as recited in claim 1, wherein the autonomous emergency braking system is configured to activate the actuating device to reduce the hydraulic force when the autonomous emergency braking system ascertains that the braking event is no longer present.

4. The brake system as recited in claim 1, wherein the autonomous emergency braking system is configured to fuse sensor data and, using the sensor data fused after the first point in time, to ascertain whether the braking event is still present.

5. The brake system as recited in claim 1, wherein the autonomous emergency braking system is configured to ascertain trajectories of the motor vehicle and/or of objects in an environment of the motor vehicle and, using the ascertained trajectories, to ascertain whether the braking event is still present.

6. The brake system as recited in claim 1, wherein, after ascertaining that the braking event is no longer present, the autonomous emergency braking system is configured to activate the anti-lock braking system to reduce the hydraulic force applied to at least one wheel brake of the motor vehicle before the actuating device has fully generated the hydraulic force to be generated.

7. The brake system as recited in claim 1, further comprising a bypass connection which connects the emergency braking system directly to the hydraulic unit, wherein the emergency braking system is configured to activate the hydraulic unit directly via a signal via the bypass connection to reduce the hydraulic force applied to at least one wheel brake of the motor vehicle based on ascertaining that the braking event is no longer present.

8. A method for operating a brake system of a motor vehicle, comprising the following steps:
ascertaining an object list using sensor data, wherein the object list is continuously updated based on newly added sensor data;
ascertaining a braking event based on the object list at a first point in time;
generating a hydraulic force via an actuating device of the brake system, wherein a transmission device of the brake system transmits the hydraulic force generated by the actuating device to at least one wheel brake of the motor vehicle;
ascertaining whether the braking event is still present on the basis of the updated object list at a second point in time, after the first point in time; and
reducing the hydraulic force applied to at least one wheel brake of the motor vehicle via a hydraulic unit of an anti-lock braking system of the brake system based on ascertaining that the braking event is no longer present.

9. The method as recited in claim 8, wherein sensor data are fused and wherein, using the sensor data fused after the first point in time, it is ascertained whether the braking event is still present.

10. The method as recited in claim 8, wherein trajectories of the motor vehicle and/or of objects in the environment of the motor vehicle are ascertained and wherein, using the ascertained trajectories, it is ascertained whether the braking event is still present.

\* \* \* \* \*